United States Patent
Bahirat et al.

(10) Patent No.: US 12,457,175 B2
(45) Date of Patent: Oct. 28, 2025

(54) MANAGING QUALITY OF SERVICE BY ALLOCATING DIE PARALLELISM WITH VARIABLE QUEUE DEPTH

(71) Applicant: SK Hynix NAND Product Solutions Corp., Rancho Cordova, CA (US)

(72) Inventors: Shirish Bahirat, Longmont, CO (US); Anand Ramalingam, Portland, OR (US); Solomon Sagar Albert Jayaraj, Gainesville, FL (US); Fnu Sachin, Blacksburg, VA (US); Xin Guo, San Jose, CA (US)

(73) Assignee: SK Hynix NAND Product Solutions Corp., Rancho Cordova, CA (US)

( * ) Notice: Subject to any disclaimer, the term of this patent is extended or adjusted under 35 U.S.C. 154(b) by 865 days.

(21) Appl. No.: 17/355,915

(22) Filed: Jun. 23, 2021

(65) Prior Publication Data

US 2021/0392083 A1    Dec. 16, 2021

(51) Int. Cl.
*H04L 47/24* (2022.01)
(52) U.S. Cl.
CPC .................... *H04L 47/24* (2013.01)

(58) Field of Classification Search
CPC ..... H04L 47/24; H04L 47/781; H04L 47/805; H04L 47/83
See application file for complete search history.

(56) References Cited

U.S. PATENT DOCUMENTS

| | | | |
|---|---|---|---|
| 2017/0171106 A1* | 6/2017 | Woo | H04L 67/1097 |
| 2020/0089537 A1* | 3/2020 | Bahirat | G06F 9/468 |
| 2020/0393974 A1 | 12/2020 | Bahirat | |
| 2021/0281639 A1* | 9/2021 | Kachare | G06F 3/067 |

* cited by examiner

*Primary Examiner* — Soe Hlaing
(74) *Attorney, Agent, or Firm* — Haley Guiliano LLP

(57) ABSTRACT

Systems, apparatuses and methods provide for a memory controller to manage quality of service enforcement. For example, a memory controller includes logic to determine a plurality of projected bandwidth levels and a plurality of projected quality of service levels on a user-by-user basis. The projected bandwidth levels and the projected quality of service levels are determined for a plurality of device configurations based on one or more storage device parameters. A requested bandwidth level and a requested quality of service level is received from a host in response to the plurality of projected bandwidth levels and the plurality of projected quality of service levels.

17 Claims, 14 Drawing Sheets

900

| Dies | PDF | | CDF |
|---|---|---|---|
| | 32 | Tr | |
| QD | 64 | | 85 |
| | Prob | Accum | |
| 0 | 0.131084032478475000000 | | 0.131084032478475000000 |
| 1 | 0.270625099331040000000 | | 0.401709131788875000000 |
| 2 | 0.274990020267019000000 | | 0.676699152055894000000 |
| 3 | 0.183326680178013000000 | | 0.860025832233907000000 |
| 4 | 0.090184899119828900000 | | 0.950210731353736000000 |
| 5 | 0.034910283530256400000 | | 0.985121014883993000000 |
| 6 | 0.011073692087554400000 | | 0.996194706971547000000 |
| 7 | 0.002959788668562940000 | | 0.999154495640110000000 |
| 8 | 0.000680274008500353000 | | 0.999834769648611000000 |
| 9 | 0.000136542453319067000 | | 0.999971312101930000000 |
| 10 | 0.000024225273975963500 | | 0.999995537375906000000 |
| 11 | 0.000003836260395020620 | | 0.999999373636301000000 |
| 12 | 0.000000546563981101180 | | 0.999999920200282000000 |
| 13 | 0.000000070524384646580 | | 0.999999990724666000000 |
| 14 | 0.000000008287427688883 | | 0.999999999012094000000 |
| 15 | 0.000000000891121256869 | | 0.999999999903215000000 |
| 16 | 0.000000000088034156424 | | 0.999999999991249000000 |
| 17 | 0.000000000008018291287 | | 9.99999999999268000000E-01 |
| 18 | 0.000000000000675375789 | | 9.99999999999943000000E-01 |
| 19 | 0.000000000000052745817 | | 9.99999999999996000000E-01 |
| 20 | 0.000000000000003828335 | | 1.00000000000000000000E+00 |
| 21 | 0.000000000000000258750 | | 1.00000000000000000000E+00 |
| 22 | 0.000000000000000016314 | | 1.00000000000000000000E+00 |
| 23 | 0.000000000000000000961 | | 1.00000000000000000000E+00 |
| 24 | 0.000000000000000000053 | | 1.00000000000000000000E+00 |
| 25 | 0.000000000000000000002 | | 1.00000000000000000000E+00 |
| 26 | 0.000000000000000000000 | | 1.00000000000000000000E+00 |
| 27 | 0.000000000000000000000 | | 1.00000000000000000000E+00 |
| 28 | 0.000000000000000000000 | | 1.00000000000000000000E+00 |
| 29 | 0.000000000000000000000 | | 1.00000000000000000000E+00 |
| 30 | 0.000000000000000000000 | | 1.00000000000000000000E+00 |
| 31 | 0.000000000000000000000 | | 1.00000000000000000000E+00 |
| 32 | 0.000000000000000000000 | | 1.00000000000000000000E+00 |
| 33 | 0.000000000000000000000 | | 1.00000000000000000000E+00 |
| 34 | 0.000000000000000000000 | | 1.00000000000000000000E+00 |
| 35 | 0.000000000000000000000 | | 1.00000000000000000000E+00 |
| 36 | 0.000000000000000000000 | | 1.00000000000000000000E+00 |
| 37 | 0.000000000000000000000 | | 1.00000000000000000000E+00 |
| 38 | 0.000000000000000000000 | | 1.00000000000000000000E+00 |
| 39 | 0.000000000000000000000 | | 1.00000000000000000000E+00 |
| 40 | 0.000000000000000000000 | | 1.00000000000000000000E+00 |
| 41 | 0.000000000000000000000 | | 1.00000000000000000000E+00 |
| 42 | 0.000000000000000000000 | | 1.00000000000000000000E+00 |
| 43 | 0.000000000000000000000 | | 1.00000000000000000000E+00 |
| 44 | 0.000000000000000000000 | | 1.00000000000000000000E+00 |
| 45 | 0.000000000000000000000 | | 1.00000000000000000000E+00 |
| 46 | 0.000000000000000000000 | | 1.00000000000000000000E+00 |
| 47 | 0.000000000000000000000 | | 1.00000000000000000000E+00 |
| 48 | 0.000000000000000000000 | | 1.00000000000000000000E+00 |
| 49 | 0.000000000000000000000 | | 1.00000000000000000000E+00 |
| 50 | 0.000000000000000000000 | | 1.00000000000000000000E+00 |

| Projected QoS | | | | | | | | | |
|---|---|---|---|---|---|---|---|---|---|
| | | | | | | | | | |
| 0.5 | 0.9 | 0.99 | 0.999 | 0.9999 | 0.99999 | 0.999999 | 0.9999999 | 0.99999999 | 0.999999999 |
| 0 | 0 | 0 | 0 | 0 | 0 | 0 | 0 | 0 | 0 |
| 0 | 0 | 0 | 0 | 0 | 0 | 0 | 0 | 0 | 0 |
| 170 | 0 | 0 | 0 | 0 | 0 | 0 | 0 | 0 | 0 |
| 255 | 0 | 0 | 0 | 0 | 0 | 0 | 0 | 0 | 0 |
| 340 | 340 | 0 | 0 | 0 | 0 | 0 | 0 | 0 | 0 |
| 425 | 425 | 0 | 0 | 0 | 0 | 0 | 0 | 0 | 0 |
| 510 | 510 | 510 | 0 | 0 | 0 | 0 | 0 | 0 | 0 |
| 595 | 595 | 595 | 595 | 0 | 0 | 0 | 0 | 0 | 0 |
| 680 | 680 | 680 | 680 | 0 | 0 | 0 | 0 | 0 | 0 |
| 765 | 765 | 765 | 765 | 765 | 0 | 0 | 0 | 0 | 0 |
| 850 | 850 | 850 | 850 | 850 | 0 | 0 | 0 | 0 | 0 |
| 935 | 935 | 935 | 935 | 935 | 935 | 0 | 0 | 0 | 0 |
| 1020 | 1020 | 1020 | 1020 | 1020 | 1020 | 1020 | 0 | 0 | 0 |
| 1105 | 1105 | 1105 | 1105 | 1105 | 1105 | 1105 | 1105 | 0 | 0 |
| 1190 | 1190 | 1190 | 1190 | 1190 | 1190 | 1190 | 1190 | 1190 | 1190 |
| 1275 | 1275 | 1275 | 1275 | 1275 | 1275 | 1275 | 1275 | 1275 | 1275 |
| 1360 | 1360 | 1360 | 1360 | 1360 | 1360 | 1360 | 1360 | 1360 | 1360 |
| 1445 | 1445 | 1445 | 1445 | 1445 | 1445 | 1445 | 1445 | 1445 | 1445 |
| 1530 | 1530 | 1530 | 1530 | 1530 | 1530 | 1530 | 1530 | 1530 | 1530 |
| 1615 | 1615 | 1615 | 1615 | 1615 | 1615 | 1615 | 1615 | 1615 | 1615 |
| 1700 | 1700 | 1700 | 1700 | 1700 | 1700 | 1700 | 1700 | 1700 | 1700 |
| 1785 | 1785 | 1785 | 1785 | 1785 | 1785 | 1785 | 1785 | 1785 | 1785 |
| 1870 | 1870 | 1870 | 1870 | 1870 | 1870 | 1870 | 1870 | 1870 | 1870 |
| 1955 | 1955 | 1955 | 1955 | 1955 | 1955 | 1955 | 1955 | 1955 | 1955 |
| 2040 | 2040 | 2040 | 2040 | 2040 | 2040 | 2040 | 2040 | 2040 | 2040 |
| 2125 | 2125 | 2125 | 2125 | 2125 | 2125 | 2125 | 2125 | 2125 | 2125 |
| 2210 | 2210 | 2210 | 2210 | 2210 | 2210 | 2210 | 2210 | 2210 | 2210 |
| 2295 | 2295 | 2295 | 2295 | 2295 | 2295 | 2295 | 2295 | 2295 | 2295 |
| 2380 | 2380 | 2380 | 2380 | 2380 | 2380 | 2380 | 2380 | 2380 | 2380 |
| 2465 | 2465 | 2465 | 2465 | 2465 | 2465 | 2465 | 2465 | 2465 | 2465 |
| 2550 | 2550 | 2550 | 2550 | 2550 | 2550 | 2550 | 2550 | 2550 | 2550 |
| 2635 | 2635 | 2635 | 2635 | 2635 | 2635 | 2635 | 2635 | 2635 | 2635 |
| 2720 | 2720 | 2720 | 2720 | 2720 | 2720 | 2720 | 2720 | 2720 | 2720 |
| 2805 | 2805 | 2805 | 2805 | 2805 | 2805 | 2805 | 2805 | 2805 | 2805 |
| 2890 | 2890 | 2890 | 2890 | 2890 | 2890 | 2890 | 2890 | 2890 | 2890 |
| 2975 | 2975 | 2975 | 2975 | 2975 | 2975 | 2975 | 2975 | 2975 | 2975 |
| 3060 | 3060 | 3060 | 3060 | 3060 | 3060 | 3060 | 3060 | 3060 | 3060 |
| 3145 | 3145 | 3145 | 3145 | 3145 | 3145 | 3145 | 3145 | 3145 | 3145 |
| 3230 | 3230 | 3230 | 3230 | 3230 | 3230 | 3230 | 3230 | 3230 | 3230 |
| 3315 | 3315 | 3315 | 3315 | 3315 | 3315 | 3315 | 3315 | 3315 | 3315 |
| 3400 | 3400 | 3400 | 3400 | 3400 | 3400 | 3400 | 3400 | 3400 | 3400 |
| 3485 | 3485 | 3485 | 3485 | 3485 | 3485 | 3485 | 3485 | 3485 | 3485 |
| 3570 | 3570 | 3570 | 3570 | 3570 | 3570 | 3570 | 3570 | 3570 | 3570 |
| 3655 | 3655 | 3655 | 3655 | 3655 | 3655 | 3655 | 3655 | 3655 | 3655 |
| 3740 | 3740 | 3740 | 3740 | 3740 | 3740 | 3740 | 3740 | 3740 | 3740 |
| 3825 | 3825 | 3825 | 3825 | 3825 | 3825 | 3825 | 3825 | 3825 | 3825 |
| 3910 | 3910 | 3910 | 3910 | 3910 | 3910 | 3910 | 3910 | 3910 | 3910 |
| 3995 | 3995 | 3995 | 3995 | 3995 | 3995 | 3995 | 3995 | 3995 | 3995 |
| 4080 | 4080 | 4080 | 4080 | 4080 | 4080 | 4080 | 4080 | 4080 | 4080 |
| 4165 | 4165 | 4165 | 4165 | 4165 | 4165 | 4165 | 4165 | 4165 | 4165 |
| 4250 | 4250 | 4250 | 4250 | 4250 | 4250 | 4250 | 4250 | 4250 | 4250 |

FIG. 9B

MANAGING QUALITY OF SERVICE BY ALLOCATING DIE PARALLELISM WITH VARIABLE QUEUE DEPTH

TECHNICAL FIELD

Embodiments generally relate to memory controllers. More particularly, embodiments relate to memory controller to manage quality of service enforcement in a data server environment.

BACKGROUND

As cloud-based use cases continue to grow, the transition towards cloud-based use cases is causing a shift in application development processes as well as the types of applications getting deployed. Traditional applications designed to support and automate existing business processes (e.g., collaboration, data analytics, supply chain, and web infrastructure) are often key to maintaining operational stability for the enterprises as well as modern consumers. However, a new breed of cloud-based applications and services often drive revenue and new customer experiences by leveraging big data, artificial intelligence, and cloud native technologies. These cloud-based applications and services are becoming epistemic drivers of the digital economy era. Understanding these applications and their deployment trends at a more concrete levels can help to predict the shifts driving the digitization and service economy more strongly than looking at the cloud at more general level.

One of the aspects of these new cloud-based applications is to provide a specific service to the user or its host application regardless of where an application or service is being deployed. The infrastructure that deploys these applications often eliminates the need for workload-specific environments, thus originating composable infrastructures that fluidly sets resources and their allocations dynamically. Not only is monetization of such service level applications getting ubiquitous, but also the time variant services these applications provide are getting monetized. Different cloud-based applications often require different combinations of resources (e.g., some cloud-based applications require very high-performance storage, while others are able to work with lower levels of storage performance). If an infrastructure on which any workload can operate can be provided, the right service level for each workload could then be potentially established. In such a situation, cloud service provides (CSPs) and their end users are more able to move to on-demand resource management.

Some features in the Non-Volatile Memory Express (NVMe) specification include a stream/directive feature, a weighted round robin, use of sets, Input Output determinism (IOD), and their combinations. These features have not seen industry adaptation due to obvious failings to address fundamental problems. For example, unlike many other prevailing data center architectures, composable infrastructure systems are typically required to be built right alongside the software that manages the application environment. This tight coupling is done to help the two sides of the house cooperate to make sure that entire range of business workloads are well supported. Solving challenges to enable composable environment, requires a deep understanding of platforms that include solid state drives (SSD) with various media types and other advanced memories.

While compossible infrastructure brings much promise, there are often challenges to allowing a host to configure application performance requirements in a sensible way to achieve bandwidth as well as quality of service. One of the reasons the challenges to allowing a host to configure application performance requirements remains unaddressed is that the fundamental understanding of how to achieve a requested quality of service remains hazy. Most of the cloud infrastructure remains underutilized at a rate of about twenty percent in best case scenarios and a rate of about forty percent in more typical case scenarios.

BRIEF DESCRIPTION OF THE DRAWINGS

The various advantages of the embodiments will become apparent to one skilled in the art by reading the following specification and appended claims, and by referencing the following drawings, in which:

FIGS. 9A-9B are a chart that provides an illustration of determining predicted quality of service according to an embodiment;

DESCRIPTION OF EMBODIMENTS

Figure 1:
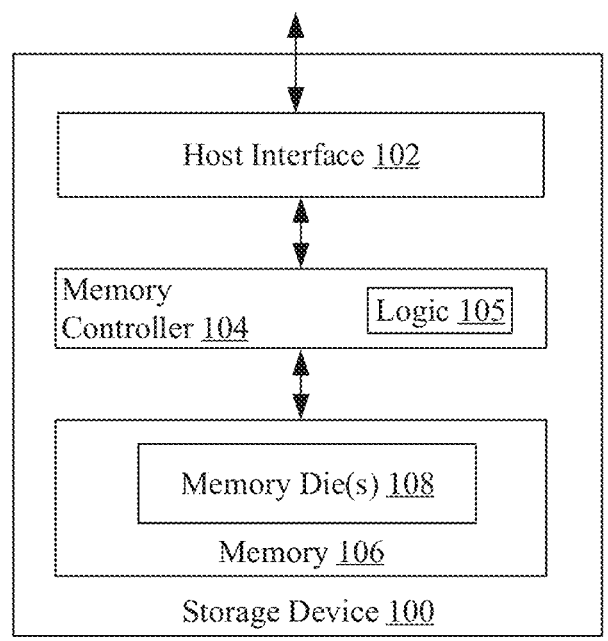
FIG. 1 is a block diagram of an example storage device according to an embodiment.

As discussed above, bandwidth level service allocation (e.g., a service-level agreement (SLA)) is common for some premier cloud users. Most of the lower priority cloud users do not get any SLA commitment. However, when a customer's experience is directly impacted with poor SLA, lost business is an unwanted result. Often, CSPs tend to maintain a compute to memory ratio or a compute to storage ratio for service requirements. Each storage and compute server boxes are typically not custom built for these service requirements. Thus, it is common to see underutilization of resources of these storage and compute server boxes, and common to see poor customer experiences as a result. Another methodology is to specifically assign premier cloud users to designated faster and more expensive levels of hardware.

As discussed above, the Non-Volatile Memory Express (NVMe) specification include features like streams/directives, weighted round robin, sets, Input Output determinism (IOD), and their combinations. In general, such approaches typically involve host driven direct placement (and related approaches) of user commands. Such host driven direct placement of user commands are typically too complex and not actually beneficial. For example, even if a host takes control over workload placement and tries to isolate workload to a few dies, the resulting lost parallelism and the resulting increased probability of die collision typically makes the performance worse. Programming or reading schemes for data center memory media (e.g., single-level cell (SLC), quad-level cell (QLC), three-dimensional (3D) crosspoint memory, INTEL OPTANE three-dimensional (3D) crosspoint memory, and/or the like, all of which are able to be utilized in solid state drives (SSDs)) are complex and host interventions make these programing or reading schemes harder to implement.

As will be described in greater detail below, some implementations described herein take a different approach compared to such direct placement and related approaches. Instead, some implementations provide a memory controller to dynamically manage quality of service enforcement. For example, some implementations enable SSDs (and data center platform technology that enables CSPs) to support nearly any kind of workloads, with improved utilization of resources, while providing the ability to run applications anywhere to enhance end user experience.

As will be described in greater detail below, some implementations described herein utilize several features for compossible cloud application environments. For example, a speed of media quality of service (QoS) determination methodology is utilized for multi-queue depth and multi-tenant workloads. Additionally or alternatively, some implementations provide a mechanism for a host to configure QoS bandwidth (BW) requirements using this speed of media quality of service (QoS) determination. Conversely, current methods remain based on trial and error (e.g., adding applications until QoS degrades to some threshold). Such implementations allow a host to use the strengths of workload understanding and customer asks (e.g., customer requirements) optimally, and allow SSDs to utilize internal optimization techniques.

Additionally or alternatively, some implementations described herein provide a SSD architecture that delivers SLAs with minimum fundamental changes. For example, many aspects of the various implementations described herein are able to be implemented on traditional block device SSDs as well as on emerging architectures.

In summary, the various implementations described herein address the problem of load balancing SLAs for BW and QoS in compossible cloud application environments.

FIG. 1 is a block diagram of a storage device 100 shared by a plurality of users that provides per tenant Bandwidth (BW) allocation and Quality of Service (QoS). The storage device 100 includes a host interface 102, a memory controller 104 that includes logic 105, and a memory 106 that includes one or more memory dies 108.

The storage device 100 is implementable in several formats. For example, storage device 100 is implementable as an SSD. For example, such a SSD is implementable as a single-level cell (SLC) SSD, a multi-level cell (MLC) SSD, a triple-layer cell (TLC) SSD, a quad-level cell (QLC) SSD, a penta-level cell (PLC) SSD, a transistor-less stackable cross point SSD architecture (e.g., INTEL OPTANE SSD), or the like.

Alternatively, storage device 100 is implementable via as a data center persistent memory (DCPM). For example, such a DCPM is implementable as a transistor-less stackable cross point architecture data center persistent memory or the like. Such a DCPM is implementable as a transistor-less stackable cross point architecture data center persistent memory (e.g., INTEL OPTANE persistent memory) in which memory cells (e.g., sitting at the intersection of word lines and bit lines) are distributed across a plurality of storage dies and individually addressable, and in which bit storage is based on a change in bulk resistance and the like.

In some embodiments, the host interface 102 communicatively couples memory controller 104 to a host (not shown). For example, host interface 102 communicatively couples memory controller 104 to the host using the NVMe (NVM express) protocol over PCIe (Peripheral Component Interconnect Express) or Fabric. Commands (for example, read, write ("program"), erase commands for the memory 106) received from the host are queued and processed by the memory controller 104. The logic 105 of memory controller is implementable via transistor array, other integrated circuit/IC components, the like, and combinations thereof. For example, the logic 105 of the memory controller 104 is integrated onto a semiconductor die, as will be discussed in greater detail below with respect to FIG. 8. In some examples, the logic 105 of memory controller 104, which may include one or more of configurable or fixed-functionality hardware, is configured to perform one or more aspects of the method 600 (FIG. 6) and/or the method 700 (FIG. 7), which are discussed in more detail below.

In implementations where the storage device 100 is a SSD, the SSD includes memory 106 that is a non-volatile (NVM) memory. In such an embodiment, the memory dies 108 include a plurality of non-volatile memory dies. Such a SSD has a large number of non-volatile memory dies 108 (for example, 256 NAND dies) with each non-volatile memory die 108 operating on one command at a time.

As will be described in greater detail below, the memory controller 104 determines a plurality of projected bandwidth levels and a plurality of projected quality of service levels on a user-by-user basis. These projected bandwidth levels and the projected quality of service levels are determined for a plurality of device configurations based on one or more storage device parameters. These storage device parameters are utilized to determine the upper limit of the speed of whatever media makes up the storage device 100 (hereinafter referred to as "speed of media QoS"). Such a speed of media QoS with projected bandwidth levels and the projected quality of service levels are used by the host to communicate a requested bandwidth level and a requested quality of service level to the memory controller 104. In response, the memory controller 104 directs bandwidth allocation and quality of service control.

Additionally or alternatively, as will be described in greater detail below, commands to be performed for a user that require a requested BW and QoS are executed based on priority (for example, high, mid, low priority) of the commands. For example, the memory controller 104 receives, from a host, a command priority in response to the plurality of projected bandwidth levels and the plurality of projected quality of service levels. The memory controller 104 then control the internal queue depth to maintain the requested quality of service level. For example, the internal queue depth is controlled by dynamically reallocating the command priority via the memory controller 104.

Figure 2:
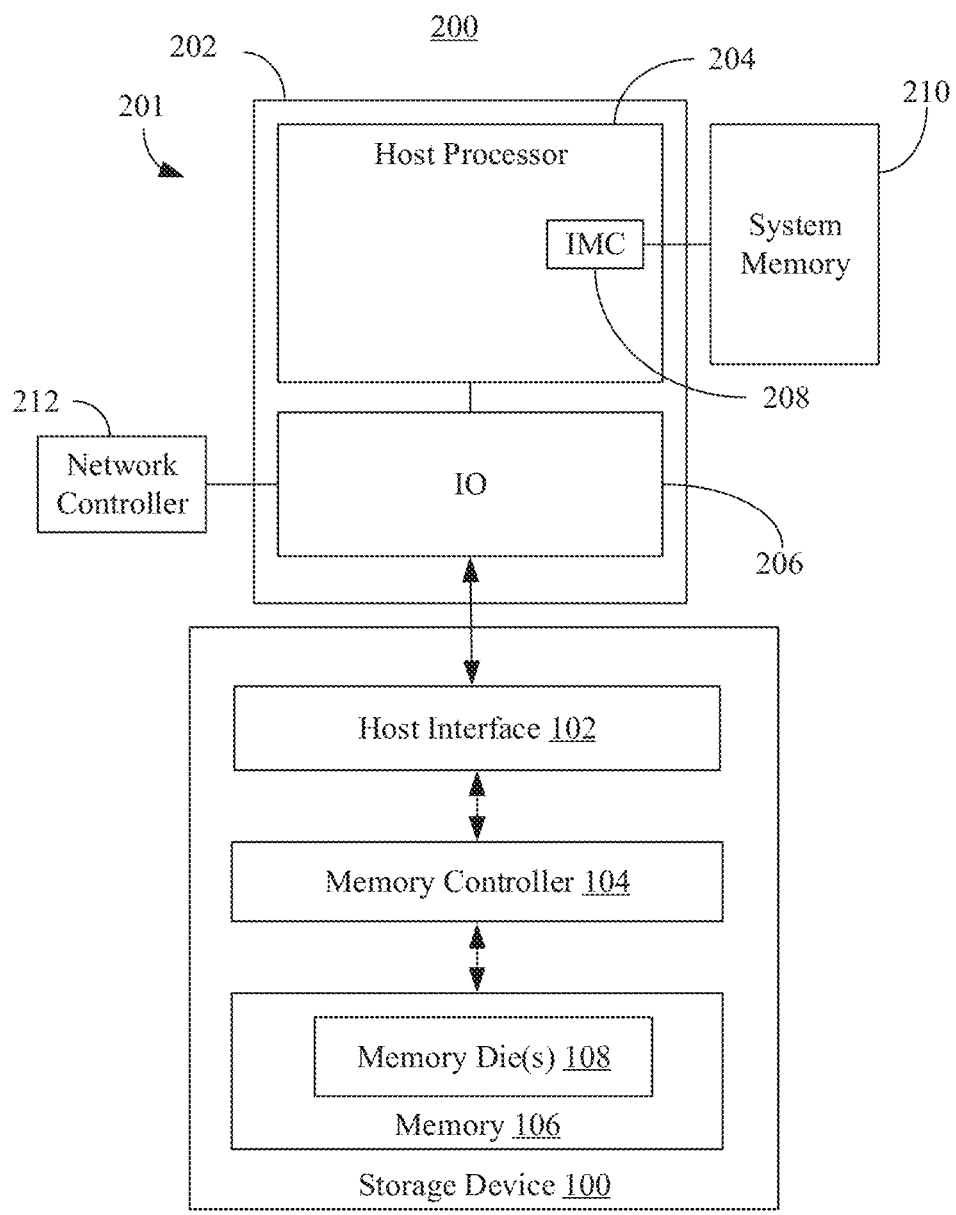
FIG. 2 is an illustration of an example of a cloud computing system according to an embodiment.

Turning now to FIG. 2, a cloud computing system 200 is shown. In the illustrated example, storage device 100 (e.g., a solid state drive (SSD)) is in communication with a host 201.

The illustrated cloud computing system 200 also includes a system on chip (SoC) 202 having a host processor 204 (e.g., central processing unit/CPU) and an input/output (IO) module 206. The host processor 204 typically includes an integrated memory controller (IMC) 208 that communicates with system memory 210 (e.g., dynamic random access memory/DRAM). The illustrated IO module 206 is coupled to the storage device 100 (e.g., a solid state drive (SSD)) as well as other system components such as a network controller 212.

Figure 3:
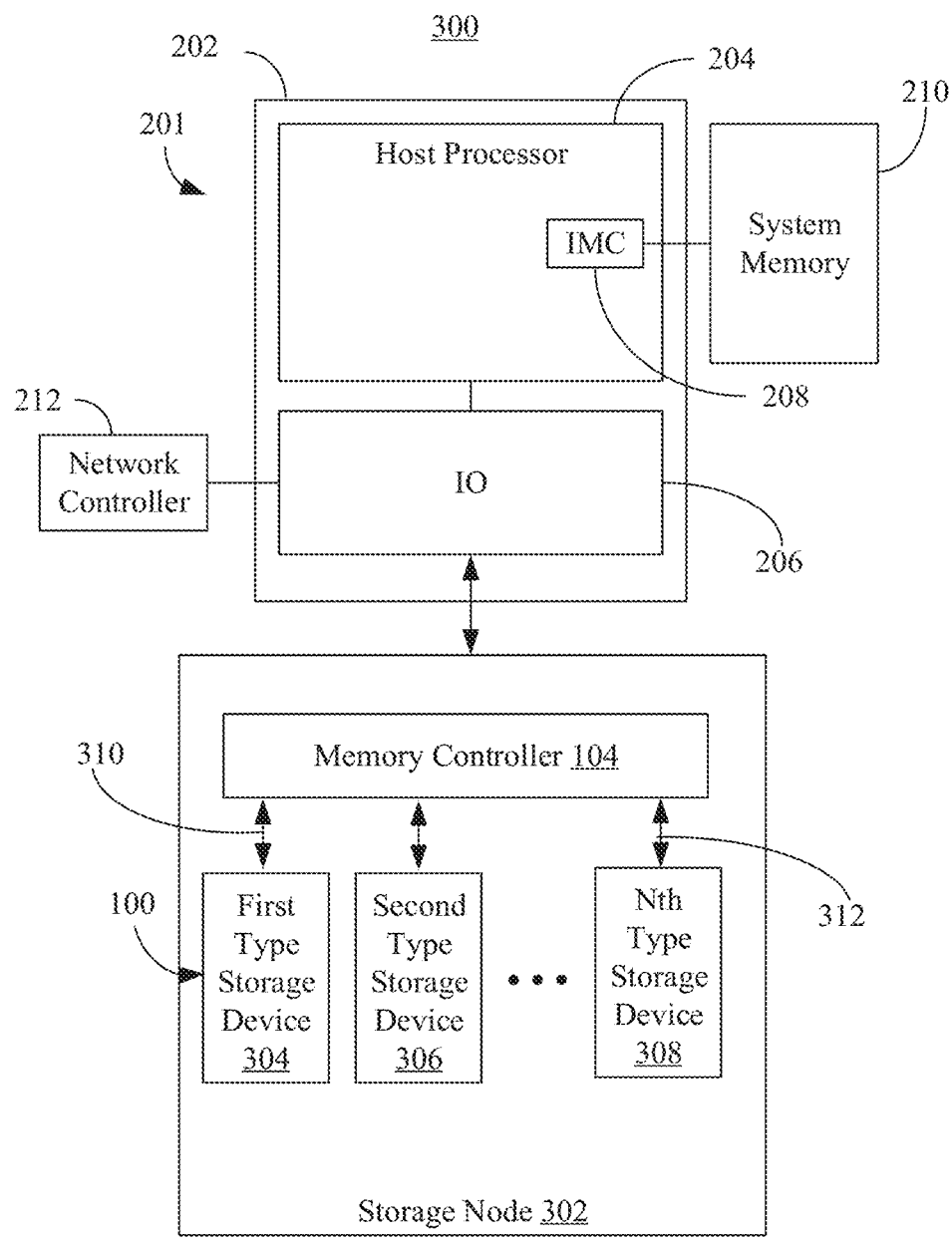
FIG. 3 is an illustration of another example of the cloud computing system according to an embodiment.

FIG. 3 shows another example of a cloud computing system 300. In the illustrated example, a plurality of storage devices 100 (e.g., a solid state drive (SSD)) is in communication with a host 201. The plurality of storage devices 100 include more than one type of device.

More particularly, the plurality of storage devices 100 include a first type storage device 304, a second type storage device 306, and up to an Nth type storage device 308. The first type storage device 304 has a first media type and the second type storage device 306 has a second media type. For example, the second type storage device 306 is to operate more slowly than the first type storage device 304.

In one example, in a cloud computing environment, the first (e.g., relatively fast) type storage device 304 is implementable via as a data center persistent memory (DCPM) (e.g., INTEL OPTANE persistent memory or the like). In one implementation, such DCPM is in a DIMM package, operates on the DRAM bus 310 and can be used as volatile or persistent memory. In one example, the memory controller 104 may utilize such DCPM in particular to handle buffered high priority small size write commands.

Additionally, the second (e.g., relatively slow) type storage device 306 is implementable via as an SSD. For example, such SSD is implementable as a single-level cell (SLC) SSD, a multi-level cell (MLC) SSD, a triple-layer cell (TLC) SSD, a quad-level cell (QLC) SSD, a penta-level cell (PLC) SSD, or the like. Such SSDs reside on a PCIe bus 312. In one example, the memory controller 104 may utilize such SSDs in particular to handle reads and low priority large size writes.

Further, the Nth (e.g., operating between the relatively fast and relatively slow storage devices) type storage device 308 is implementable via as a transistor-less stackable cross point SSD architecture (e.g., INTEL OPTANE SSD), or the like. For example, such transistor-less stackable cross point SSDs reside on the PCIe bus 312 using the NVMe protocol and are persistent for storage reasons. In one example, the memory controller 104 may utilize such transistor-less stackable cross point SSDs in particular to handle buffered high priority large size writes.

The storage devices 100 may be part of a memory device that includes non-volatile memory and/or volatile memory. Non-volatile memory is a storage medium that does not require power to maintain the state of data stored by the medium. In one embodiment, the memory structure is a block addressable storage device, such as those based on NAND or NOR technologies. A storage device may also include future generation nonvolatile devices, such as a three-dimensional (3D) crosspoint memory device, or other byte addressable write-in-place nonvolatile memory devices. In one embodiment, the storage device may be or may include memory devices that use silicon-oxide-nitride-oxide-silicon (SONOS) memory, electrically erasable programmable read-only memory (EEPROM), chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory. The term "storage device" may refer to the die itself and/or to a packaged memory product. In some embodiments, 3D crosspoint memory may comprise a transistor-less stackable cross point architecture in which memory cells sit at the intersection of word lines and bit lines and are individually addressable and in which bit storage is based on a change in bulk resistance. In particular embodiments, a memory module with non-volatile memory may comply with one or more standards promulgated by the Joint Electron Device Engineering Council (JEDEC), such as JESD235, JESD218, JESD219, JESD220-1, JESD223B, JESD223-1, or other suitable standard (the JEDEC standards cited herein are available at jedec.org).

Volatile memory is a storage medium that requires power to maintain the state of data stored by the medium. Examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of the memory modules complies with a standard promulgated by JEDEC, such as JESD79F for Double Data Rate (DDR) SDRAM, JESD79-2F for DDR2 SDRAM, JESD79-3F for DDR3 SDRAM, or JESD79-4A for DDR4 SDRAM (these standards are available at jedec.org). Such standards (and similar standards) may be referred to as DDR-based standards and communication interfaces of the storage devices that implement such standards may be referred to as DDR-based interfaces.

In operation, the memory controller 104 receives a request for a change in media type among a plurality of storage devices 100 from host 201. The memory controller 104 select a target storage device from the plurality of storage devices 100 including a first type storage device 304 of a first media type and a second type storage device 306 of a second (slower) media type. The memory controller 104 then issues an incoming user command to the selected target storage device.

In one example, high priority writes are staged in OPTANE DCPMM or OPTANE SSD and only low priority longer length writes are directed towards other SSDs. Such a framework, along with other aspects discussed in more detail below, provides a mechanism to deliver dynamic service-level agreement (SLA) capability for reads, manageability of writes to minimize read interference, de-staging and aggregation of data triggering to minimize read interference and garbage collection management commands.

Figure 4:
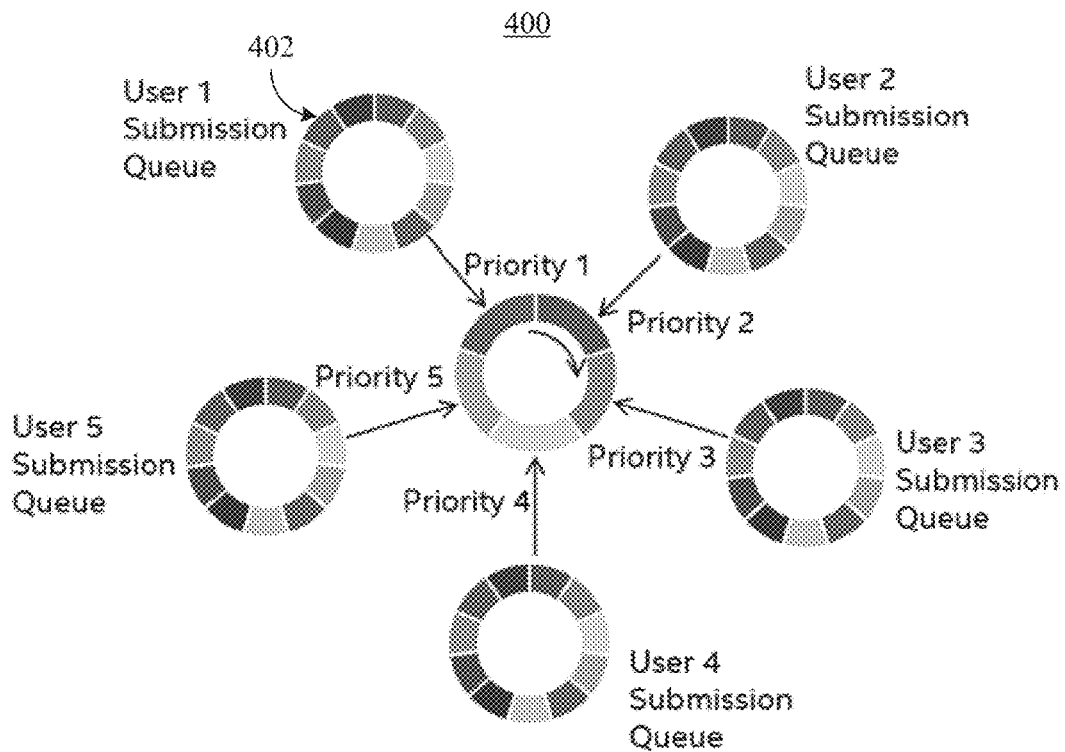
FIG. 4 is an illustration of an example diagram of adjusting priority among user submission queues according to an embodiment.

FIG. 4 shows an example diagram 400 of adjusting priority among user submission queues 402. As illustrated, user submission queues 402 include a plurality of submission queues (e.g., user 1 submission queue, user 2 submission queue, user 3 submission queue, user 4 submission queue, and user 5 submission queue). Each of user submission queues 402 has a corresponding priority (e.g., priorities 1-5). As will be described in greater detail below, such priority is capable of being dynamically changed to improve storage device operation.

As illustrated, changes in overall command flow are demonstrated in diagram 400 where the host and/or memory controller adjust the priority in a multi-tenant environment. For example, the host and/or memory controller apply change in priority to deliver required SLA. Additionally or alternatively, such a change by the host and/or memory controller will also change media type or buffer allocation (e.g., an increase in buffer allocation as a function of priority) in some cases.

Figure 5:
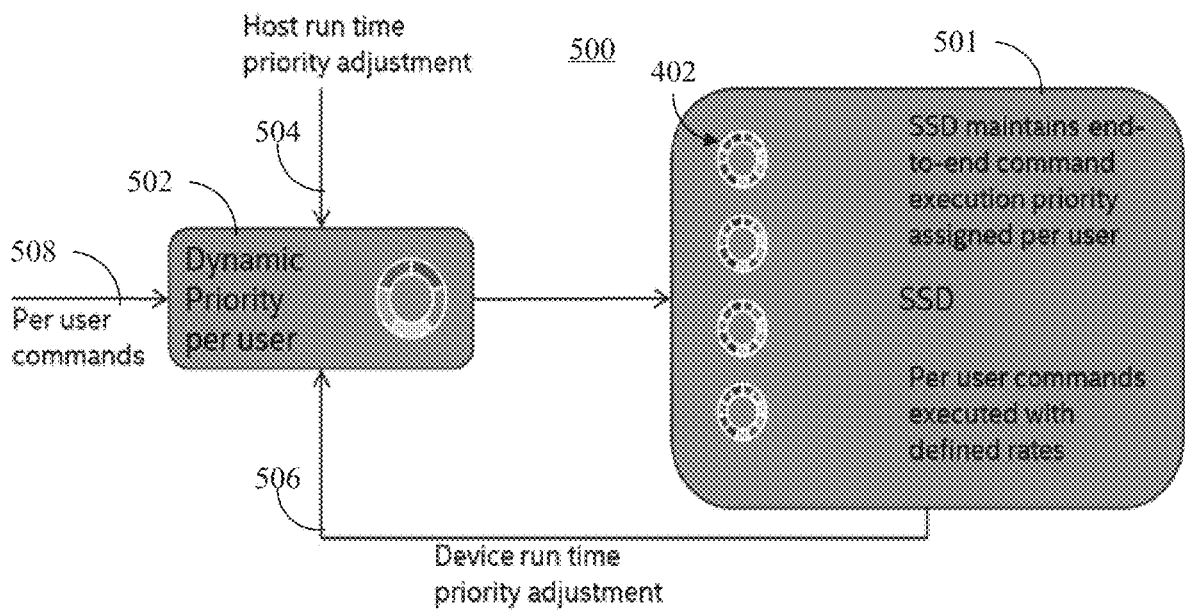
FIG. 5 is a flowchart of an example of a method of operating the cloud computing system according to an embodiment.

FIG. 5 shows an example method 500 for operating the cloud computing system according to an embodiment. The method 500 may generally be implemented in a memory controller, such as, for example, the memory controllers (e.g., see FIGS. 1-3), already discussed.

More particularly, the method 500 (as well as method 600 (FIG. 6), and method 700 (FIG. 7)) may be implemented in one or more modules as a set of logic instructions stored in a machine- or computer-readable storage medium such as random access memory (RAM), ROM, programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 500 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 501 provides for the storage device (e.g., an SSD for the like) to maintain end-to-end command execution priority assigned per user. Additionally, block 501 provides for per user commands being executed with defined rates.

Illustrated processing block 502 provides for dynamic priority adjustment on a per user basis. As input for this decision, processing block 502 receives a host runtime priority adjustment at processing block 504 and/or receives a device run time priority adjustment at processing block 506.

Illustrated processing block 508 provides for receiving user commands, which will be processed according to an updated priority supplied by processing block 502.

Additional and/or alternative operations for method 500 are described in greater detail below in the description of FIG. 7.

Figure 6:
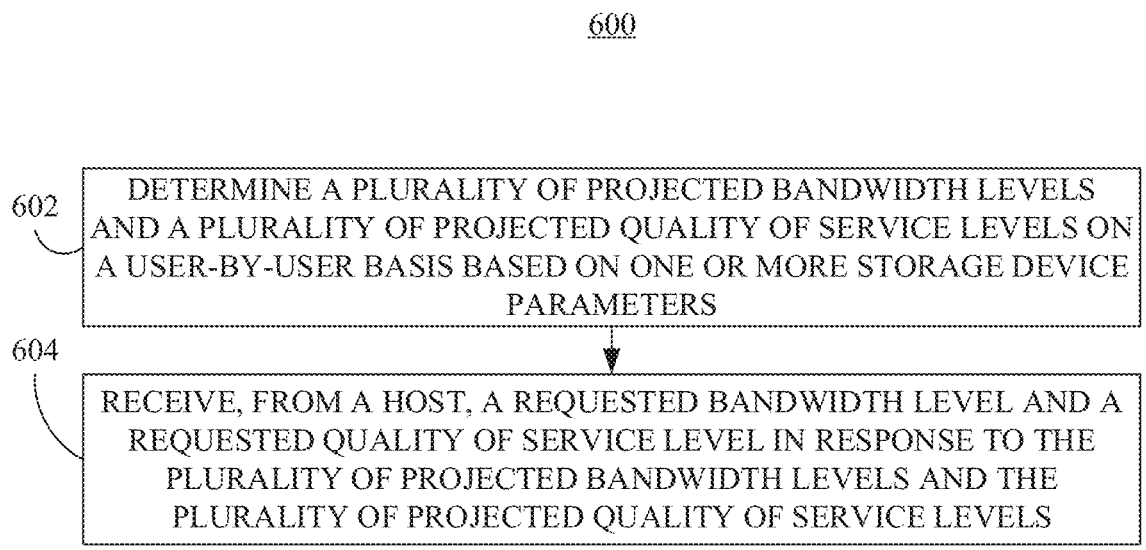
FIG. 6 is a flowchart of an example of another method of operating cloud computing system according to an embodiment.

FIG. 6 is a flowchart of an example of another method 600 for operating the cloud computing system according to an embodiment. The method 600 may generally be implemented in a memory controller, such as, for example, the memory controllers (e.g., see FIGS. 1-3), already discussed.

Illustrated processing block 602 provides for determining a plurality of projected bandwidth levels and a plurality of projected quality of service levels on a user-by-user basis. In such an operation, the projected bandwidth levels and the projected quality of service levels are determined for a plurality of device configurations based on one or more storage device parameters.

For example, the one or more storage device parameters include one or more of a number of dies, an internal queue depth, a media operation speed, a per die read projection, a per die write projection, or a program or erase suspend projection.

In one example, a log page is used to report multi-tenant capability (e.g., the plurality of projected bandwidth levels and the plurality of projected quality of service levels) for host budgeting. Additional details regarding the determination of the plurality of projected bandwidth levels and the plurality of projected quality of service levels are discussed below with regard to FIGS. 9-14, where such multi-tenant capability is determined based on device physics rather than heuristics.

Illustrated processing block 604 provides for receiving, from a host, a requested bandwidth level and a requested quality of service level in response to the plurality of projected bandwidth levels and the plurality of projected quality of service levels.

Additional and/or alternative operations for method 600 are described in greater detail below in the description of FIG. 7.

Figure 7:
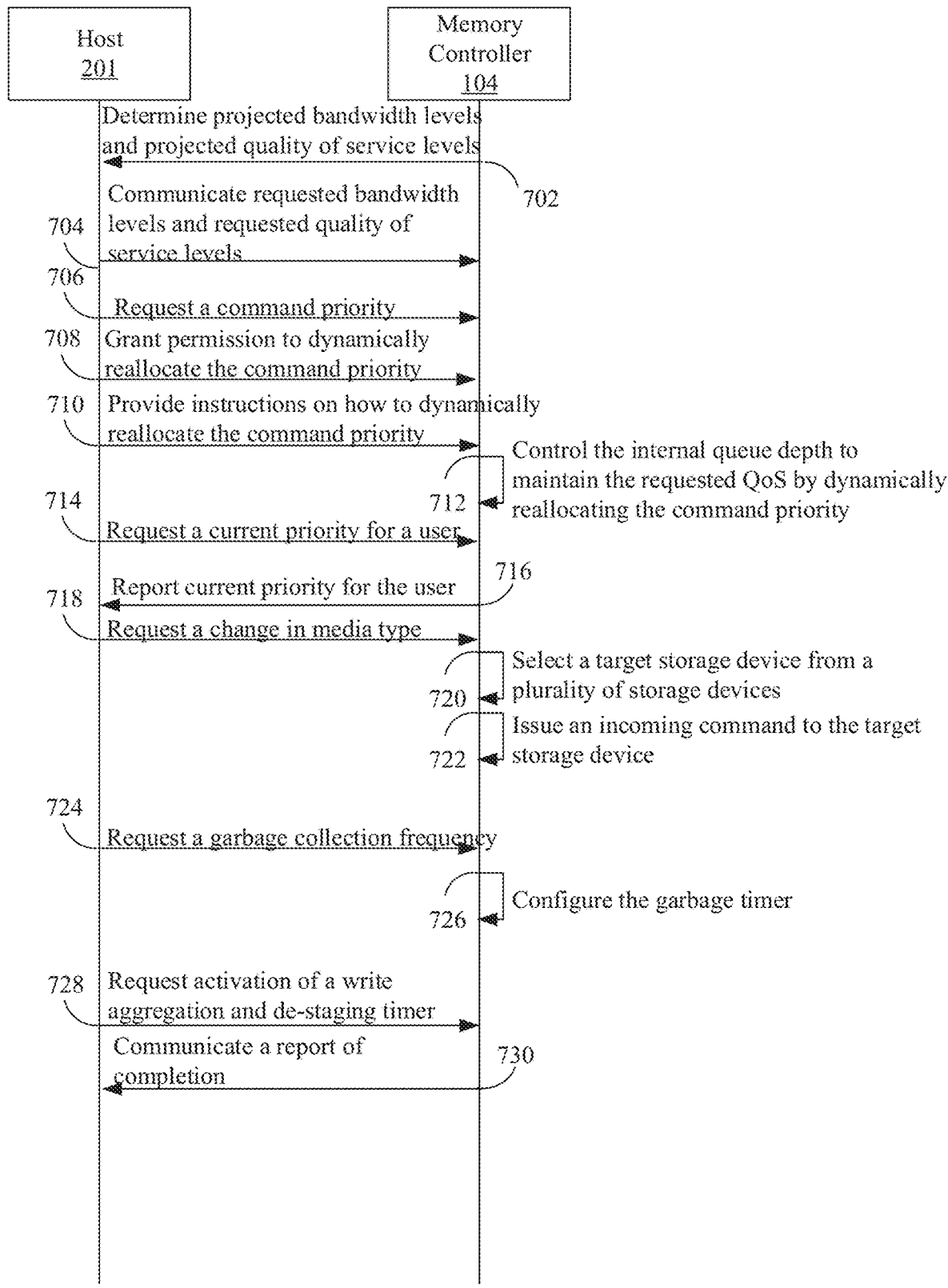
FIG. 7 is a flowchart of an example of a further method of operating cloud computing system according to an embodiment.

FIG. 7 is a flowchart of an example of a further method 700 for operating the cloud computing system according to an embodiment. The method 700 may generally be implemented in a memory controller, such as, for example, the memory controllers (e.g., see FIGS. 1-3), already discussed.

In the illustrated example, method 700 may be implemented via memory controller 104. As illustrated, memory controller 104 may operate in communication with 201.

Illustrated processing block 702 provides for determining a plurality of projected bandwidth levels and a plurality of projected quality of service levels on a user-by-user basis. In such an operation, the projected bandwidth levels and the projected quality of service levels are determined for a plurality of device configurations based on one or more storage device parameters.

For example, the one or more storage device parameters include one or more of a number of dies, an internal queue depth, a media operation speed, a per die read projection, a per die write projection, or a program or erase suspend projection.

Illustrated processing block 704 provides for receiving, from a host, a requested bandwidth level and a requested quality of service level in response to the plurality of projected bandwidth levels and the plurality of projected quality of service levels.

Illustrated processing block 706 provides for receiving, from a host, a requested command priority. For example, the requested command priority is selected by the host in response to the plurality of projected bandwidth levels and the plurality of projected quality of service levels.

Illustrated processing block 708 provides for receiving, from the host, permission to dynamically reallocate the command priority via the memory controller.

For example, a "set feature command" is utilized to configure per user priority on the fly. In operation, the host sends this command any time to define if the priority can be dynamically changed by controller to optimize die loading.

Illustrated processing block 710 provides for receiving, from the host, instructions on how to dynamically reallocate the command priority.

For example, the "set feature command" also configures control mechanisms for priority adjustment (e.g., dynamic reallocation of the command priority). In some examples, the dynamic reallocation of the command priority is based at least in part on one or more of a change in the internal queue depth, a change in media type among a plurality of storage devices, a change in power management per user, a change in defragment policy, the like, and/or combinations thereof.

In one example, one or more of blocks 704-710 are implemented via an Application Programming Interface (API) utilized by the host to dynamically configure priority.

Illustrated processing block 712 provides for controlling the internal queue depth to maintain the requested quality of service level. For example, the internal queue depth is controlled based at least in part on dynamically reallocating the command priority via the memory controller.

In some examples, the dynamic reallocation of the command priority for a first user includes configuring a first percentage of first user commands to be executed at a first priority and a second percentage of first user commands to be executed at a second different priority. For example, the dynamic reallocation of the command priority may configure priority by use case instead of changing all command execution priorities (e.g., changing from number 1 priority to number 2 priority or vice versa). For example, the dynamic reallocation of the command priority may configure a certain percentage of user commands to be executed by a first priority and the remaining percentage of user commands with another priority.

In some implementations, such dynamic reallocation of the command priority is utilized as a part command fetching process.

Additionally or alternatively, Method 700 may include an operation to return command size in a completion queue entry. In such an example, such data is utilized for the dynamic reallocation of the command priority.

In one example, an Application Programming Interface (API) utilized for the dynamic reallocation of the command priority by the memory controller.

Illustrated processing block 714 provides for receiving, from the host, a request for a current priority of a first user. For example, a "get feature command" is utilized to get the current priority on a per user basis.

Illustrated processing block 716 provides for reporting the current priority of the first user to the host based on the dynamic reallocation of the command priority. For example, the current priority of the first user is reported to the host periodically, in response to a change in priority, and/or in response to a request for this information from the host.

Illustrated processing block 718 provides for receiving, from the host, a request for a change in media type among a plurality of storage devices.

Illustrated processing block 722 provides for selecting a target storage device from the plurality of storage devices. For example, the plurality of storage devices include a first storage device of a first media type and a second storage device of a second different media type. In such an example, the second device is to operate more slowly than the first device.

Illustrated processing block 722 provides for issuing an incoming user command to the target storage device. For example, incoming commands are issued to the selected target storage device instead of a storage device that was previously designated for those incoming commands.

As discussed above, in one example, the plurality of storage devices include a range of types, including, but not limited to quad level cell solid state drives, three-dimensional crosspoint solid state drives, three-dimensional crosspoint data center persistent memory, the like, and/or combinations thereof.

Illustrated processing block 724 provides for receiving, from the host, a requested garbage collection frequency for a garbage collection timer.

Illustrated processing block 726 provides for configuring the garbage collection timer based on the requested garbage collection frequency.

For example, such a garbage collection timer communicates a garbage collection start, where the host can configure garbage collection frequency. In operation, the garbage collection timer operates like an interrupt. Such an implementation is simpler than implementing async event notification (or any other type of command protocol).

Illustrated processing block 728 provides for receiving, from the host, a request to activate a write aggregation and de-staging timer; and Illustrated processing block 730 provides for sending, to the host, a report of completion when ready to accept de-staged writes in response to the write aggregation and de-staging timer.

For example, such a write aggregation and de-staging timer is utilized to invoke write aggregation and de-staging. In operation, the host will enqueue this command and the memory controller will send the completion once it is ready to accept de-staged writes.

Additional details regarding the various operations of Method 700 are discussed below with regard to FIGS. 9-14.

Figure 8:
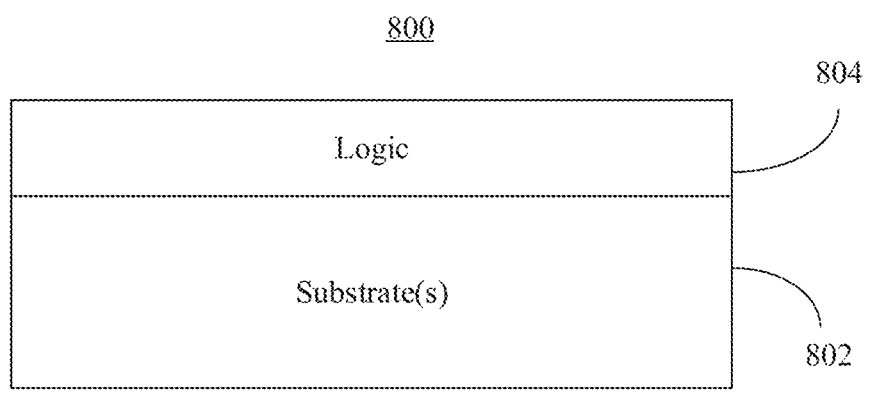
FIG. 8 is an illustration of an example of a semiconductor package apparatus according to an embodiment.

FIG. 8 shows a semiconductor apparatus 800 (e.g., chip and/or package). The illustrated apparatus 800 includes one or more substrates 802 (e.g., silicon, sapphire, gallium arsenide) and logic 804 (e.g., transistor array and other integrated circuit/IC components) coupled to the substrate(s) 802. In an embodiment, the logic 804 implements one or more aspects of the method 500 (FIG. 5), the method 600 (FIG. 6), and/or the method 700 (FIG. 7), already discussed.

Thus, when operated as a controller, the logic 804 determines a plurality of projected bandwidth levels and a plurality of projected quality of service levels on a user-by-user basis. These projected bandwidth levels and the projected quality of service levels are determined for a plurality of device configurations based on one or more storage device parameters. These storage device parameters are utilized to determine the upper limit of the speed of whatever media makes up the storage device (hereinafter referred to as "speed of media QoS"). Such a speed of media QoS with projected bandwidth levels and the projected quality of service levels are used by the host to communicate a requested bandwidth level and a requested quality of service level to the logic 804. In response, the logic 804 directs bandwidth allocation and quality of service control.

Additionally or alternatively, commands to be performed for a user that require a requested BW and QoS are executed based on priority (for example, high, mid, low priority) of the commands. For example, when operated as a controller, the logic 804 receives, from a host, a command priority in response to the plurality of projected bandwidth levels and the plurality of projected quality of service levels. The logic 804 then control the internal queue depth to maintain the requested quality of service level. For example, the internal queue depth is controlled by dynamically reallocating the command priority via the logic 804.

Additionally or alternatively, when operated as a controller, the logic 804 receives a request for a change in media type among a plurality of storage devices from a host. The logic 804 select a target storage device from the plurality of storage devices including a first type storage device of a first media type and a second type storage device of a second (slower) media type. The logic 804 then issues an incoming user command to the selected target storage device.

In one example, the logic 804 includes transistor channel regions that are positioned (e.g., embedded) within the substrate(s) 802. Thus, the interface between the logic 804 and the substrate 152 may not be an abrupt junction. The logic 804 may also be considered to include an epitaxial layer that is grown on an initial wafer of the substrate 802.

Speed of Light QoS Methodology for Multi Queue Depth (QD) Workloads

Given that workloads are random and cannot be predicted, techniques utilized herein take a probabilistic approach to resource allocation. A "speed of light QoS" (also referred to herein as "speed of media QoS") projection methodology considers SSD parameters like number of dies, internal QD, media operation times, per die read probability, per die write probability as well program/erase suspend probabilities, the like, and/or combinations thereof. These parameters are able to be prioritized and dynamically varies so as to extend the speed of media QoS methodology for multi-tenant use cases. Estimation of QoS in such a speed of media QoS methodology starts by deriving a Cumulative density function (CDF) of key SSD and workload parameters.

Equation 1:

$$f(CDF) = \int_{n=0}^{n=\infty} f(x)dx \quad (1)$$

Where CDF projects cumulative probability of command completion times as a function of $f(x)$ below.

Equation 2

$$f(x)_x = \binom{n}{x} p^x q^{n-x} \quad (2)$$

Equation 2 defines the probability of having x number of read or write commands on a given die, p denotes the probability of a specific command landing to the given die and q denotes the probability of a specific command to land any other die.

FIGS. 9A-9B are a chart 900 that provides an illustration of determining predicted quality of service according to an embodiment. Once $f(x)$ of Equation 2 is parameterized based on parameters defined above, a single tenant speed of light QoS calculator can be developed as shown in FIGS. 9A-9B.

As all probabilities are integrated, the answer converges to 1 (e.g., as shown in column "Accum" or CDF in chart 900). By thresholding to required "9" levels (e.g., such as 99.99 or 99.999, etc.), CDF can provide the probability of given 9 levels as a function of considered parameters as projected QoS in chart 900. For the given probability the number of commands waiting to be executed on a specific die is computed, and this information is used to compute the probabilistic latency that the host sees as quality of service.

Figure 10:
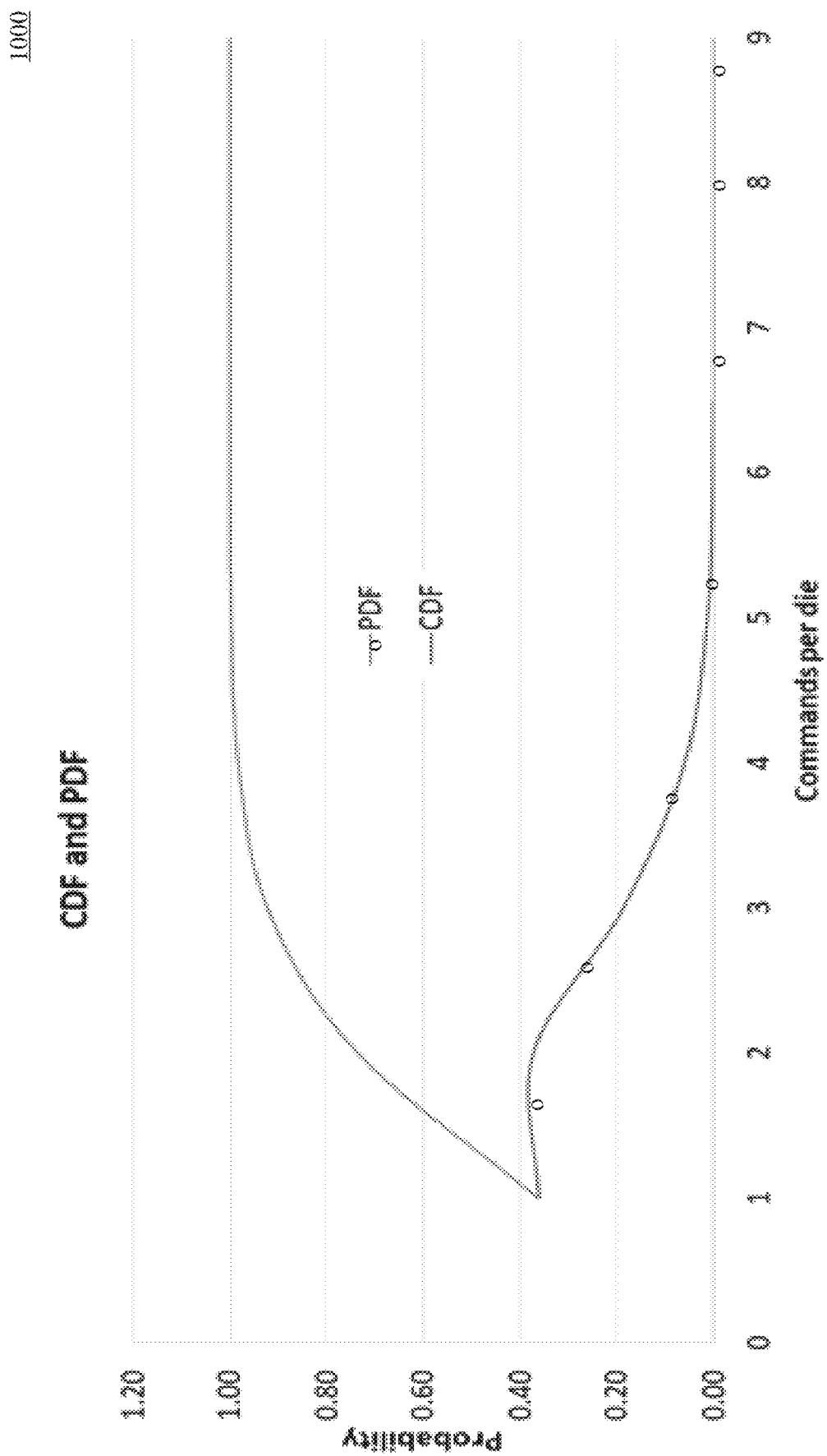
FIG. 10 is a chart that provides an illustration of different components of the predicted quality of service over a range of commands per die and the associated collision probability according to an embodiment.

FIG. 10 is a chart 1000 that provides an illustration of different components of the predicted quality of service over a range of commands per die and the associated collision probability according to an embodiment.

Computed CDF and PDF (probability density function) are shown in chart 1000. As QD, dies, and read time are parameterized, the speed of media QoS can be projected by changing these parameters.

Figure 11:
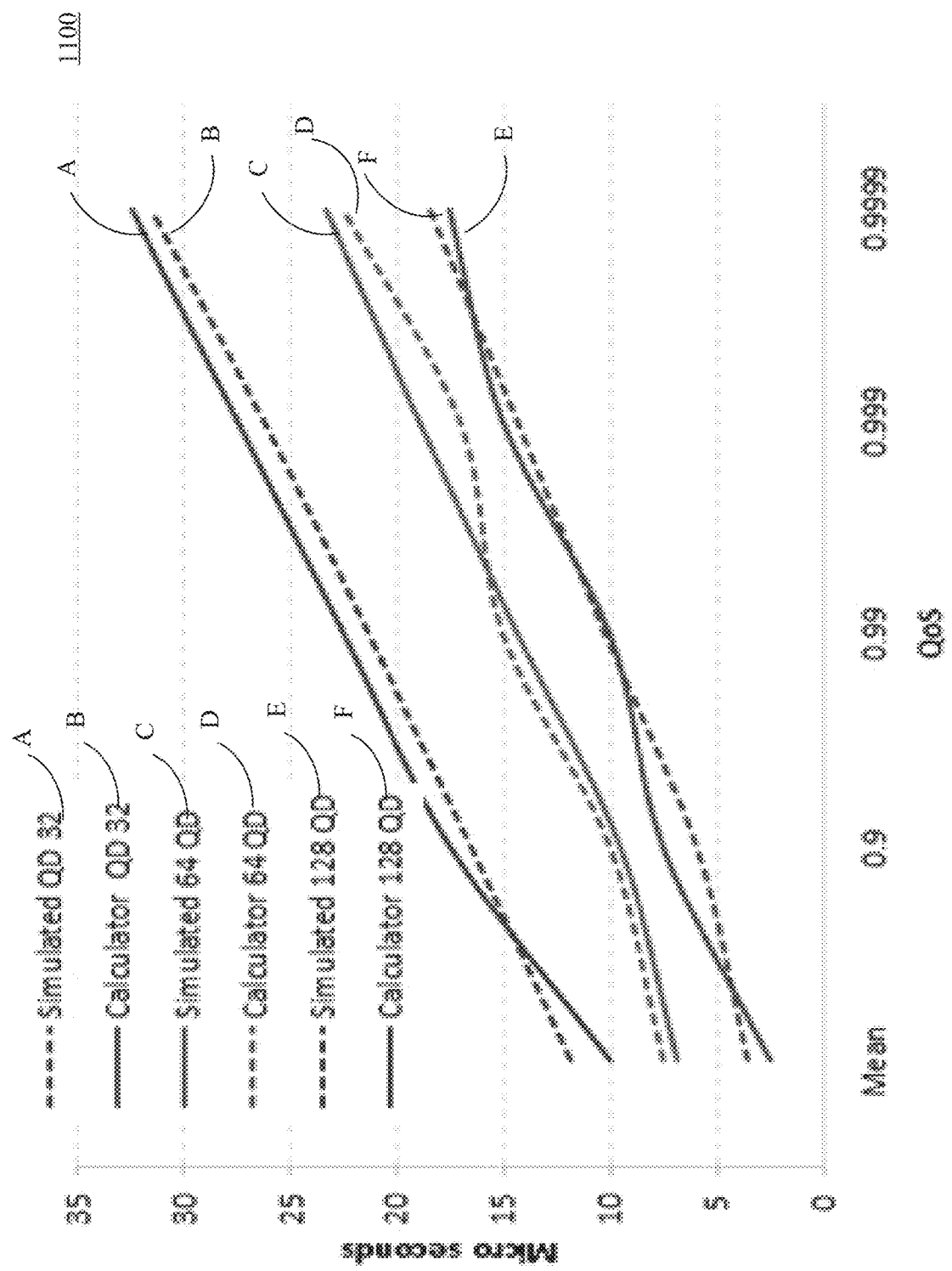
FIG. 11 is a chart that provides an illustration of predicted quality of service for several example queue depths according to an embodiment.

FIG. 11 is a chart 1100 that provides an illustration of predicted quality of service for several example queue depths according to an embodiment.

The accuracy of this speed of media QoS methodology was assessed using a transactional simulator. The chart 1100 shows the correlation studies for a few configurations and convergence of the mathematical model for the speed of media QoS methodology with transactional workloads.

Figure 12:
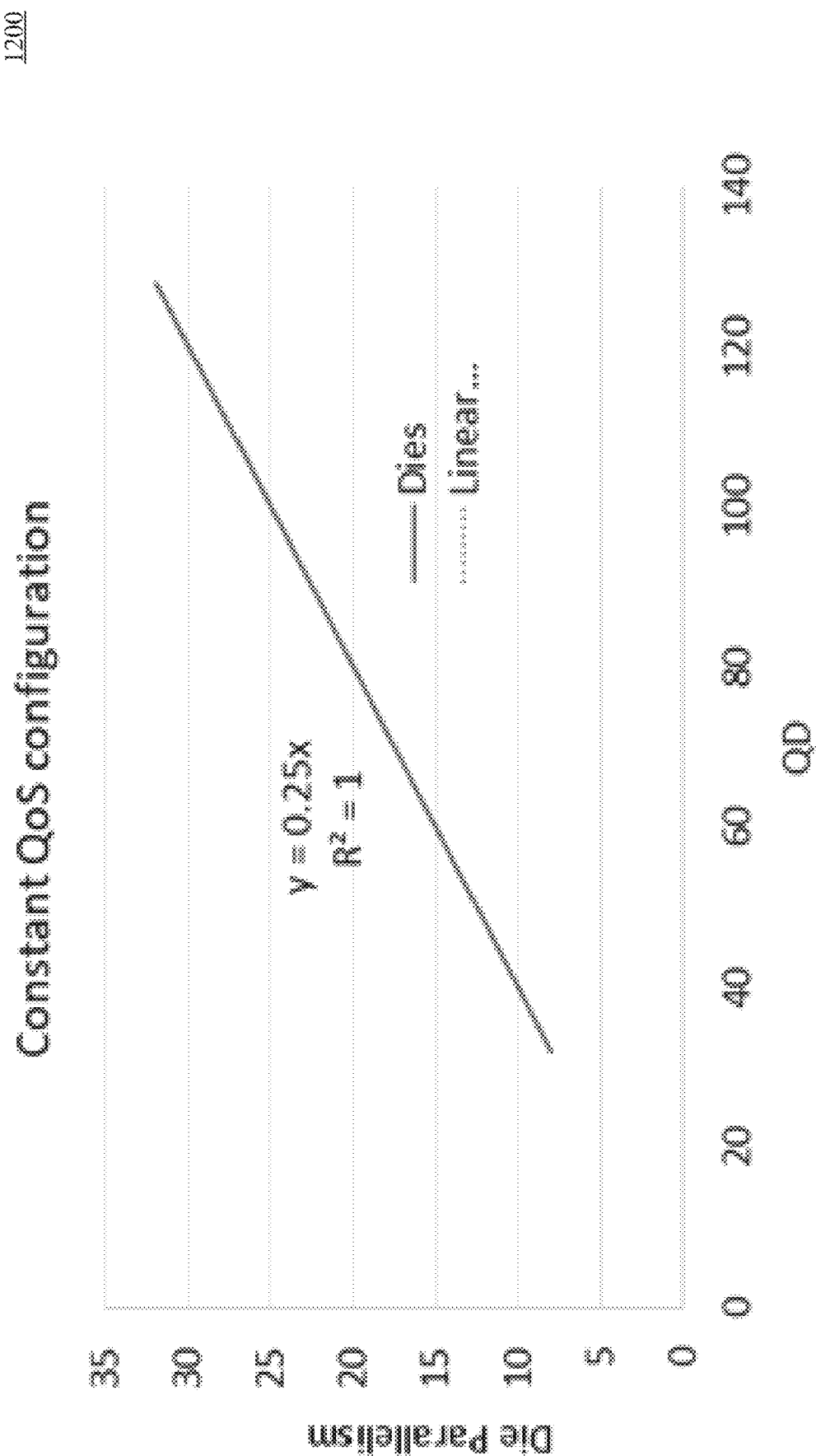
FIG. 12 is a chart that provides an illustration of the predicted quality of service having a constant relationship to die parallelism and queue depths according to an embodiment.

FIG. 12 is a chart 1200 that provides an illustration of the predicted quality of service having a constant relationship to die parallelism and queue depths according to an embodiment.

One of the key benefits of this speed of media QoS calculator is the ability to define equivalent QoS configurations as a function of various parameters as defined in the chart 1200. The ability to improve host awareness allows setting realistic expectations. Given the degree of randomness, these speed of media QoS calculations help to set achievable goals that are strived towards (rather than implementing some trial and error methods and/or heuristic methods).

The chart 1200 appears to define a fundamental relationship and has been validated through measured data. Per the chart 1200, when die parallelism is changed as a function of internal queue depth, linearly constant QoS can be obtained. However, one of the main challenges is that controlling the number of dies and the internal QD is normally not very straight forward. Instead of traditional approaches to control die parallelism, some examples herein predict die collision probability for a given workload, which is correlated to the QoS using simple relationships. For example, internal QD is controlled by allocating command execution priority dynamically within the drive, which takes a different path as compared to previous approaches. In one example, the control of internal QD by allocating command execution priority dynamically within the drive is implemented inside the storage device (e.g., inside the SSD or the like) and the host does not need to be aware of these adjustments in priorities.

Figure 13:
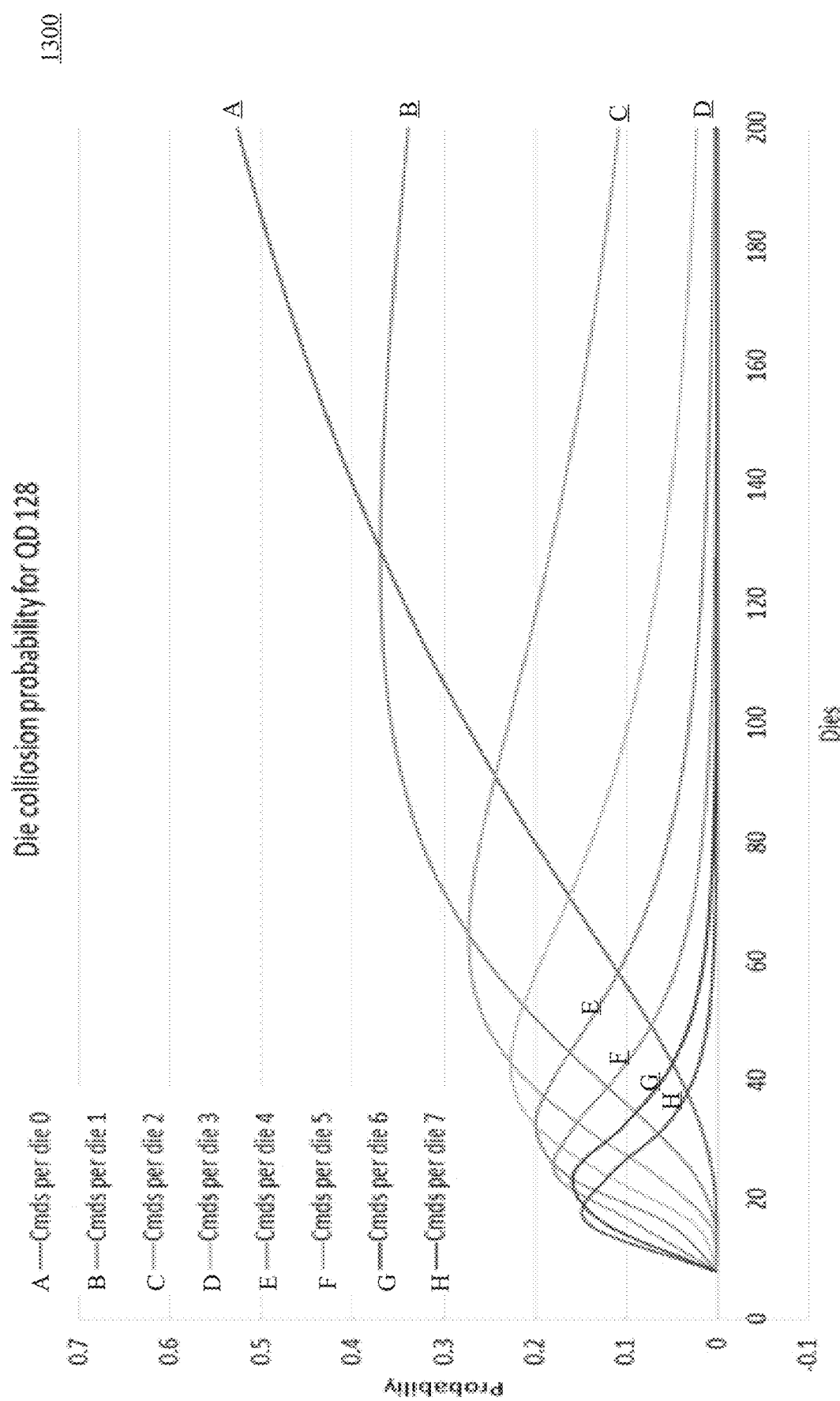
FIG. 13 is a chart that provides an illustration of die collision probability at varying commands per die and varying number of dies according to an embodiment.

FIG. 13 is a chart 1300 that provides an illustration of die collision probability at varying commands per die and varying number of dies according to an embodiment.

The die idle probability of $f(x)_x$ is understood (as the first two terms of the equation becomes 1) as achieving simplification that can be used to project overall BW as a function of per die BW (e.g., per die BW x active dies). However, to derive die collision probability, higher order effects are considered. The chart 1300 shows die collision probability and a peak for a given QD as a function of die parallelism. As incoming workloads configured to achieve specific BW can keep n dies busy, multi-tenant QoS calculations are developed using this information. Accordingly, the methodology to define the multi-QD QoS are applied to multi-tenant workloads. Such an implementation is utilized in several ways. As will be discussed in greater detail below, for example, single tenant QoS multi-QD methodology is extended to multi-tenant multi-QD QoS; methodology is defined to apply configurability under real life workload conditions; and/or speed of media QoS is utilized drive a "fair share" QoS allocation methodology. Please note that while "fair share" BW allocation is well known; however, that is not the case for "fair share" QoS.

Allocation of QoS and BW to Each User

Based on the speed of media QoS methodologies presented above, the following table 1 shows a specific use case of multi-tenancy. Here the host allocates four users and each user enqueues commands at a QD of sixteen, this device has sixty-four dies and all die parallelism is fully utilized through controller driven placement (e.g., not host driven, instead host writes and reads are logical). When each user priority is maintained end-to-end within the device, QoS and BW are projected for each user accurately using the speed of media QoS methodologies presented above. Also, BW and QoS can be projected for each user with many different configurations and that can be provided to the host as guideline. This guideline can be used for budgeting and software stack level load balancing.

TABLE 1

| Tenant | QD | BW [MB/s] | Mean Latency [us] | 0.9 [us] | 0.99 [us] | 0.999 [us] | 0.9999 [us] | 0.99999 [us] |
|---|---|---|---|---|---|---|---|---|
| Priority 1 | 16 | 1266 | 150 | 150 | 300 | 450 | 450 | 600 |
| Priority 2 | 16 | 1155 | 150 | 150 | 450 | 600 | 750 | 750 |
| Priority 3 | 16 | 897 | 150 | 300 | 450 | 600 | 900 | 900 |
| Priority 4 | 16 | 697 | 150 | 300 | 600 | 750 | 900 | 1050 |

If the host utilizes existing direct placement methodologies, then table 2 shows per user nominal BW and QoS. Interestingly, QoS and BW get worse when utilizing existing direct placement methodologies if host decides to change dies assigned to each user, as die loading and collision probability on few isolated dies looks significantly different than entire set of dies. Conversely, the methodology proposed herein of not doing direct placement makes sense, even if it seems initially non-intuitive.

TABLE 2

| Tenant | QD | BW [MB/s] | Mean Latency [us] | 0.9 [us] | 0.99 [us] | 0.999 [us] | 0.9999 [us] | 0.99999 [us] |
|---|---|---|---|---|---|---|---|---|
| Priority x | 16 | 1073 | 150 | 300 | 600 | 750 | 900 | 1050 |

Accordingly, the methodology herein defines multi-tenant BW and QoS projections that are used by the host to make intelligent decisions to assign tenants to each storage device (e.g., an SSD or the like). This methodology is applied to parameterizable configurations. Accordingly, if the host decides to assign higher QD to a priority 1 user then this methodology provides estimations accordingly. Similarly, each user can be assigned a different media type to achieve needed SLA and the methodology herein works towards achieving the speed of media QoS. The methodology herein is implemented in storage devices (e.g., SSDs or the like) by statically managing end-to-end user or tenant priorities, where the host submits commands for each user in Submission Queue/Completion Queue (CQ/SQ) pairs and communicate the priority for each user to the storage devices (e.g., SSDs or the like) through a "set feature" command (or similar command within NVMe). Additionally or alternatively, priority management principles can be also implemented at the host level rather than in an SSD implementation.

Dynamic Allocation of QoS and Bandwidth to Each User

Figure 14:
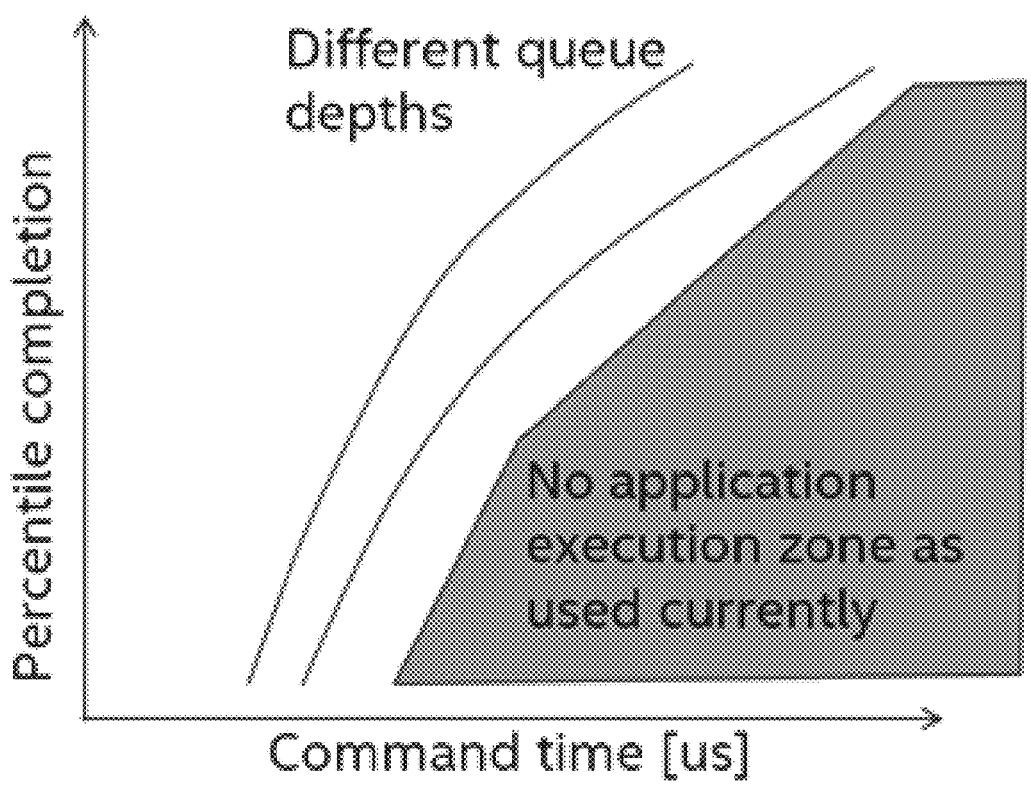
FIG. 14 is a chart that provides an illustration of how different queue depths typically affect command completion over time.

FIG. 14 is a chart 1400 that provides an illustration of how different queue depths typically affect command completion over time.

As discussed above, one of the existing methods used by CSPs depends on loading users to SSD until they reach some QoS threshold. In such an approach, there is no mechanism to communicate user priorities. For example, once a command is fetched, even if done through round robin priority, NVMe does not guarantee internal command execution order. Because of failure, the degradation of QoS is observed by all users and not just one user, as shown in table 3.

TABLE 3

| Tenant | QD | BW [MB/s] | Mean Latency [us] | 0.9 [us] | 0.99 [us] | 0.999 [us] | 0.9999 [us] | 0.99999 [us] |
|---|---|---|---|---|---|---|---|---|
| Priority all users | 64 | as cmds enqueued | 150 | 300 | 600 | 750 | 900 | 1050 |

Many service-oriented cloud-applications do not have a fixed set of priorities. For example, an application that computes salary of employees will be busy during certain part of the month. Viral news, videos, or tweets will eventually see lowered access patterns. Accordingly, the methodologies described herein are used to dynamically adjust user priority as a function of incoming workloads. For example, instead of keeping a fixed priority, the methodologies described herein us a simple mechanism for dynamic priority allocation. In such an example, the dynamic priority allocation can be used by the host in several ways. For example, the dynamic priority allocation can be used by the host to adapt the priority as a function of time variance nature of certain applications Additionally or alternatively, the dynamic priority allocation can be used by the host to balance the BW and QoS allocation with fine-tuned control as a priority gets lower. For example, higher "9" QoS often sees significant degradation that might be more than desirable. Accordingly, it is advantageous to have control over the balancing of priority for each user.

Simulated Data

The following simulated data shows promising six times improvement in worse case QoS experienced by lowest priority users when allowing lowest priority users 10% commands executed with higher priority. This priority shift was trigged when one of the lowest priority users reached a 90% limit of internal queue depth. As die loading is balanced, the quality of service improvement is observed without loss of bandwidth. However this is still a trade-off as some degradation in higher priority users is also observed.

TABLE 4

Quality of service without dynamic priority adjustment

| Tenant | QD | Mean Latency [us] | 0.9 [us] | 0.99 [us] | 0.999 [us] | 0.9999 [us] |
|---|---|---|---|---|---|---|
| Priority 1 | 32 | 3.31 | 6.8 | 11.4 | 15.9 | 20.5 |
| Priority 2 | 16 | 10.31 | 22.4 | 43.9 | 65.1 | 87.2 |
| Priority 3 | 8 | 25.4 | 62.8 | 136.1 | 197.8 | 245.8 |
| Priority 4 | 4 | 67.47 | 180.3 | 480.6 | 480.8 | 621.7 |

TABLE 5

Quality of service with dynamic priority adjustment (six time improvement in worse case QoS)

| Tenant | QD | Mean Latency [us] | 0.9 [us] | 0.99 [us] | 0.999 [us] | 0.9999 [us] |
|---|---|---|---|---|---|---|
| Priority 1 | 32 | 6.95 | 16.11 | 29.4 | 40.2 | 48.8 |
| Priority 2 | 16 | 17.33 | 45.9 | 87.8 | 115.1 | 136.5 |
| Priority 3 | 8 | 13.15 | 31.3 | 73.4 | 117.5 | 145.7 |
| Priority 4 | 4 | 8.06 | 18.16 | 43.9 | 76.9 | 104.5 |

ADDITIONAL NOTES AND EXAMPLES

Example 1 includes a memory controller comprising: one or more substrates; and a logic coupled to the one or more substrates. The logic is implemented at least partly in one or more of configurable or fixed-functionality hardware logic, the logic to: determine a plurality of projected bandwidth levels and a plurality of projected quality of service levels on a user-by-user basis, wherein the projected bandwidth levels and the projected quality of service levels are determined for a plurality of device configurations based on one or more storage device parameters; and receive, from a host, a requested bandwidth level and a requested quality of service level in response to the plurality of projected bandwidth levels and the plurality of projected quality of service levels.

Example 2 includes the memory controller of Example 1, wherein the one or more storage device parameters include one or more of a number of dies, an internal queue depth, a media operation speed, a per die read projection, a per die write projection, or a program or erase suspend projection.

Example 3 includes the memory controller of Example 2, wherein the logic coupled to the one or more substrates is to: receive, from the host, a command priority in response to the plurality of projected bandwidth levels and the plurality of projected quality of service levels; and control the internal queue depth to maintain the requested quality of service level, wherein the internal queue depth is controlled based at least in part on dynamically reallocating the command priority via the memory controller.

Example 4 includes the memory controller of Example 3, wherein the logic coupled to the one or more substrates is to: receive, from a host, permission to dynamically reallocate the command priority via the memory controller.

Example 5 includes the memory controller of Example 3, wherein the logic coupled to the one or more substrates is to: receive, from the host, instructions on how to dynamically reallocate the command priority.

Example 6 includes the memory controller of Example 3, wherein the dynamic reallocation of the command priority for a first user includes configuring a first percentage of first user commands to be executed at a first priority and a second percentage of first user commands to be executed at a second priority, and wherein the first priority is different from the second priority.

Example 7 includes the memory controller of Example 3, wherein the dynamic reallocation of the command priority is based at least in part on one or more of a change in the internal queue depth, a change in media type among a plurality of storage devices, a change in power management per user, or a change in defragment policy.

Example 8 includes the memory controller of Example 3, wherein the logic coupled to the one or more substrates is to: receive, from the host, a request for a current priority of a first user; and report the current priority of the first user to the host based on the dynamic reallocation of the command priority.

Example 9 includes the memory controller of Example 1, wherein the logic coupled to the one or more substrates is to: receive, from the host, a request for a change in media type among a plurality of storage devices; select a target storage device from the plurality of storage devices including a first storage device of a first media type and a second storage device of a second media type, wherein the second device is to operate more slowly than the first device; and issue an incoming user command to the target storage device.

Example 10 includes the memory controller of Example 9, wherein the plurality of storage devices are to include one or more of a quad level cell solid state drive, a three-dimensional crosspoint solid state drive, or a three-dimensional crosspoint data center persistent memory.

Example 11 includes the memory controller of Example 1, wherein the logic coupled to the one or more substrates is to: receive, from the host, a requested garbage collection frequency for a garbage collection timer; and configure the garbage collection timer based on the requested garbage collection frequency.

Example 12 includes the memory controller of Example 1, wherein the logic coupled to the one or more substrates is to: receive, from the host, a request to activate a write aggregation and de-staging timer; and send, to the host, a report of completion when ready to accept de-staged writes in response to the write aggregation and de-staging timer.

Example 13 includes a memory system comprising: a host interface; a plurality of memory dies; and a memory controller communicatively coupled to the host interface and the plurality of memory dies, the memory controller including logic coupled to one more substrates. The logic is to: determine a plurality of projected bandwidth levels and a plurality of projected quality of service levels on a user-by-user basis, wherein the projected bandwidth levels and the projected quality of service levels are determined for a plurality of device configurations based on one or more storage device parameters; and receive, from a host, a requested bandwidth level and a requested quality of service level in response to the plurality of projected bandwidth levels and the plurality of projected quality of service levels.

Example 14 includes the memory system of Example 13, wherein the one or more storage device parameters include one or more of a number of dies, an internal queue depth, a media operation speed, a per die read projection, a per die write projection, or a program or erase suspend projection.

Example 15 includes the memory system of Example 14, wherein the logic coupled to the one or more substrates is to: receive, from the host, a command priority in response to the plurality of projected bandwidth levels and the plurality of projected quality of service levels; and control the internal queue depth to maintain the requested quality of service level, wherein the internal queue depth is controlled based at least in part on dynamically reallocating the command priority via the memory controller.

Example 16 includes the memory system of Example 15, wherein the logic coupled to the one or more substrates is to: receive, from the host, permission to dynamically reallocate the command priority via the memory controller; receive, from the host, instructions on how to dynamically reallocate the command priority; receive, from the host, a request for a current priority of a first user; and report the current priority of the first user to the host based on the dynamic reallocation of the command priority, wherein the dynamic reallocation of the command priority for a first user includes configuring a first percentage of first user commands to be executed at a first priority and a second percentage of first user commands to be executed at a second priority, and wherein the first priority is different from the second priority, wherein the dynamic reallocation of the command priority is based at least in part on one or more of a change in the internal queue depth, a change in media type among a plurality of storage devices, a change in power management per user, or a change in defragment policy.

Example 17 includes the memory system of Example 13, wherein the logic coupled to the one or more substrates is to: receive, from the host, a request for a change in media type among a plurality of storage devices; select a target storage device from the plurality of storage devices including a first storage device of a first media type and a second storage device of a second media type, wherein the second device is to operate more slowly than the first device; and issue an incoming user command to the target storage device, wherein the plurality of storage devices are to include one or more of a quad level cell solid state drive, a three-dimensional crosspoint solid state drive, or a three-dimensional crosspoint data center persistent memory.

Example 18 includes the memory system of Example 13, wherein the logic coupled to the one or more substrates is to: receive, from the host, a requested garbage collection frequency for a garbage collection timer; configure the garbage collection timer based on the requested garbage collection frequency; receive, from the host, a request to activate a write aggregation and de-staging timer; and send, to the host, a report of completion when ready to accept de-staged writes in response to the write aggregation and de-staging timer.

Example 19 includes a method comprising: determining, via a memory controller, a plurality of projected bandwidth levels and a plurality of projected quality of service levels on a user-by-user basis, wherein the projected bandwidth levels and the projected quality of service levels are determined for a plurality of device configurations based on one or more storage device parameters; and receiving from a host, via the memory controller, a requested bandwidth level and a requested quality of service level in response to the plurality of projected bandwidth levels and the plurality of projected quality of service levels.

Example 20 includes the method of Example 19, wherein the one or more storage device parameters include one or more of a number of dies, an internal queue depth, a media operation speed, a per die read projection, a per die write projection, or a program or erase suspend projection; the method further comprising: receiving, from the host, a command priority in response to the plurality of projected bandwidth levels and the plurality of projected quality of service levels; and controlling, via the memory controller, the internal queue depth to maintain the requested quality of service level, wherein the internal queue depth is controlled based at least in part on dynamically reallocating the command priority.

Example 21 includes an apparatus comprising means for performing the method of any one of Examples 19 to 20.

Example 22 includes a machine-readable storage comprising machine-readable instructions which, when executed, implement the method of any one of Examples 19 to 20.

Technology described herein may therefore provide a performance-enhanced controller to the extent that it may advantageously improve resource utilization (and improve end user experience); explicitly plan multi-tenant use cases in the composable cloud (instead of trial and error and/or instead of using heuristics); dynamically adjust workload pressure and priority per application needs; and dynamically combine resources to meet the unique needs of each application. Technology described herein may also advantageously eliminate a need for workload-specific environments (e.g., building specific cloud resources for specific users/applications).

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc.

may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A memory controller comprising:
one or more substrates; and
a logic coupled to the one or more substrates, where the logic is implemented at least partly in one or more of configurable or fixed-functionality hardware logic, the logic to:
determine a plurality of projected bandwidth levels and a plurality of projected quality of service levels on a user-by-user basis, wherein the projected bandwidth levels and the projected quality of service levels are determined for a plurality of device configurations based on one or more storage device parameters, wherein the one or more storage device parameters include one or more of an internal queue depth, a media operation speed, a per die read projection, a per die write projection, a program suspend projection, or an erase suspend projection;
receive, from a host, a requested bandwidth level and a requested quality of service level in response to the plurality of projected bandwidth levels and the plurality of projected quality of service levels;
receive, from the host, a command priority in response to the plurality of projected bandwidth levels and the plurality of projected quality of service levels; and
control the internal queue depth to maintain the requested quality of service level, wherein the internal queue depth is controlled based at least in part on dynamically reallocating the command priority via the memory controller.

2. The memory controller of claim 1, wherein the storage device parameters include a number of dies, the internal queue depth, the media operation speed, the per die read projection, the per die write projection, the program suspend projection, and the erase suspend projection.

3. The memory controller of claim 1, wherein the logic coupled to the one or more substrates is to:
receive, from a host, permission to dynamically reallocate the command priority via the memory controller.

4. The memory controller of claim 1, wherein the logic coupled to the one or more substrates is to:
receive, from the host, instructions on how to dynamically reallocate the command priority.

5. The memory controller of claim 1, wherein the dynamic reallocation of the command priority for a first user includes configuring a first percentage of first user commands to be executed at a first priority and a second percentage of first user commands to be executed at a second priority, and wherein the first priority is different from the second priority.

6. The memory controller of claim 1, wherein the dynamic reallocation of the command priority is based at least in part on one or more of a change in the internal queue depth, a change in media type among a plurality of storage devices, a change in power management per user, or a change in defragment policy.

7. The memory controller of claim 1, wherein the logic coupled to the one or more substrates is to:
receive, from the host, a request for a current priority of a first user; and
report the current priority of the first user to the host based on the dynamic reallocation of the command priority.

8. The memory controller of claim 1, wherein the logic coupled to the one or more substrates is to:
receive, from the host, a request for a change in media type among a plurality of storage devices;
select a target storage device from the plurality of storage devices including a first storage device of a first media type and a second storage device of a second media type, wherein the second device is to operate more slowly than the first device; and
issue an incoming user command to the target storage device.

9. The memory controller of claim 8, wherein the plurality of storage devices are to include one or more of a quad level cell solid state drive, a three-dimensional crosspoint solid state drive, or a three-dimensional crosspoint data center persistent memory.

10. The memory controller of claim 1, wherein the logic coupled to the one or more substrates is to:
receive, from the host, a requested garbage collection frequency for a garbage collection timer; and
configure the garbage collection timer based on the requested garbage collection frequency.

11. The memory controller of claim 1, wherein the logic coupled to the one or more substrates is to:
receive, from the host, a request to activate a write aggregation and de-staging timer; and
send, to the host, a report of completion when ready to accept de-staged writes in response to the write aggregation and de-staging timer.

12. A memory system comprising:
a host interface;
a plurality of memory dies; and
a memory controller communicatively coupled to the host interface and the plurality of memory dies, the memory controller including logic coupled to one more substrates, wherein the logic is to:
determine a plurality of projected bandwidth levels and a plurality of projected quality of service levels on a user-by-user basis, wherein the projected bandwidth levels and the projected quality of service levels are determined for a plurality of device configurations based on one or more storage device parameters, wherein the one or more storage device parameters include one or more of an internal queue depth, a media operation speed, a per die read projection, a per die write projection, a program suspend projection, or an erase suspend projection;
receive, from a host, a requested bandwidth level and a requested quality of service level in response to the plurality of projected bandwidth levels and the plurality of projected quality of service levels;
receive, from the host, a command priority in response to the plurality of projected bandwidth levels and the plurality of projected quality of service levels; and
control the internal queue depth to maintain the requested quality of service level, wherein the internal queue depth is controlled based at least in part on dynamically reallocating the command priority via the memory controller.

13. The memory system of claim 12, wherein the storage device parameters include a number of dies, the internal queue depth, the media operation speed, the per die read projection, the per die write projection, the program suspend projection, and the erase suspend projection.

14. The memory system of claim 12, wherein the logic coupled to the one or more substrates is to:
receive, from the host, permission to dynamically reallocate the command priority via the memory controller;
receive, from the host, instructions on how to dynamically reallocate the command priority;
receive, from the host, a request for a current priority of a first user; and
report the current priority of the first user to the host based on the dynamic reallocation of the command priority,
wherein the dynamic reallocation of the command priority for a first user includes configuring a first percentage of first user commands to be executed at a first priority and a second percentage of first user commands to be executed at a second priority, and wherein the first priority is different from the second priority,
wherein the dynamic reallocation of the command priority is based at least in part on one or more of a change in the internal queue depth, a change in media type among a plurality of storage devices, a change in power management per user, or a change in defragment policy.

15. The memory system of claim 12, wherein the logic coupled to the one or more substrates is to:
receive, from the host, a request for a change in media type among a plurality of storage devices;
select a target storage device from the plurality of storage devices including a first storage device of a first media type and a second storage device of a second media type, wherein the second device is to operate more slowly than the first device; and
issue an incoming user command to the target storage device, wherein the plurality of storage devices are to include one or more of a quad level cell solid state drive, a three-dimensional crosspoint solid state drive, or a three-dimensional crosspoint data center persistent memory.

16. The memory system of claim 12, wherein the logic coupled to the one or more substrates is to:
receive, from the host, a requested garbage collection frequency for a garbage collection
configure the garbage collection timer based on the requested garbage collection frequency;
receive, from the host, a request to activate a write aggregation and de-staging timer; and
send, to the host, a report of completion when ready to accept de-staged writes in response to the write aggregation and de-staging timer.

17. A method comprising:
determining, via a memory controller, a plurality of projected bandwidth levels and a plurality of projected quality of service levels on a user-by-user basis, wherein the projected bandwidth levels and the projected quality of service levels are determined for a plurality of device configurations based on one or more storage device parameters, wherein the one or more storage device parameters include one or more of an internal queue depth, a media operation speed, a per die read projection, a per die write projection, a program suspend projection, or an erase suspend projection;
receiving from a host, via the memory controller, a requested bandwidth level and a requested quality of service level in response to the plurality of projected bandwidth levels and the plurality of projected quality of service levels;
receiving, from the host, a command priority in response to the plurality of projected bandwidth levels and the plurality of projected quality of service levels; and
controlling, via the memory controller, the internal queue depth to maintain the requested quality of service level, wherein the internal queue depth is controlled based at least in part on dynamically reallocating the command priority.

* * * * *